United States Patent
Crye

(10) Patent No.: US 8,819,865 B1
(45) Date of Patent: Sep. 2, 2014

(54) GARMENT WITH RADIUSED ZIPPER PATH

(71) Applicant: Caleb Clark Crye, Brooklyn, NY (US)

(72) Inventor: Caleb Clark Crye, Brooklyn, NY (US)

(73) Assignee: Lineweight LLC, Brooklyn, NY (US)

( * ) Notice: Subject to any disclaimer, the term of this patent is extended or adjusted under 35 U.S.C. 154(b) by 0 days.

(21) Appl. No.: 14/152,415

(22) Filed: Jan. 10, 2014

(51) Int. Cl.
*B64D 10/00* (2006.01)
*A41D 13/02* (2006.01)
*A62B 17/00* (2006.01)

(52) U.S. Cl.
CPC .............. *B64D 10/00* (2013.01); *A62B 17/001* (2013.01); *A41D 2300/322* (2013.01); *A41D 13/02* (2013.01)
USPC .................................................. 2/79; 2/2.14

(58) Field of Classification Search
CPC ........... A41D 1/06; A41D 13/02; A41D 1/08; A41D 11/00; A41D 9/08; A41D 13/1263; A41D 2300/322; A41D 2300/22; A41D 3/005; A41D 3/00; A41B 13/005; A41B 9/08; B63C 11/04; A62B 17/001; B64D 10/00; B64D 2010/005
USPC ............ 2/79, 2.14, 456, 457, 458, 2.11, 2.17, 2/69, 70, 72, 78.1, 78.3, 78.4, 80, 82, 83, 2/111, 96, 105, 227
See application file for complete search history.

(56) References Cited

U.S. PATENT DOCUMENTS

| | | | | |
|---|---|---|---|---|
| 1,677,663 A | * | 7/1928 | St Amour | 2/79 |
| 2,663,873 A | * | 12/1953 | Stern | 2/83 |
| 2,773,263 A | * | 12/1956 | Pompa et al. | 2/96 |
| 3,086,214 A | | 4/1963 | Lash | |
| 3,493,972 A | * | 2/1970 | Oldham | 2/2.17 |
| 4,038,698 A | * | 8/1977 | Smith | 2/79 |
| 4,464,795 A | | 8/1984 | Long et al. | |
| 4,862,517 A | | 9/1989 | Meistrell | |
| 5,048,124 A | | 9/1991 | Lewis, Jr. et al. | |
| 5,153,938 A | * | 10/1992 | Epperson | 2/2.14 |
| 5,153,940 A | * | 10/1992 | Bergquist | 2/80 |
| 5,191,658 A | | 3/1993 | Meistrell | |

(Continued)

OTHER PUBLICATIONS

Figure 27, "Access to the suit can be gained by a diagonal zip. This is a good design for easy donning of the suit," from Survival in Cold Waters (2003)—TP 13822 E "Chapter 4: Key Issues in the Construction of the Immersion Suit,": http://www.tc.gc.ca/eng/marinesafety/tp-tp13822-section6-272.htm, downloaded Jan. 3, 2014.

(Continued)

*Primary Examiner* — Amy Vanatta

(74) *Attorney, Agent, or Firm* — Stiennon & Stiennon

(57) ABSTRACT

A garment has an upper sleeved section extending above a waist line, and a lower section with legs extending downwardly from the crotch of a lower torso section. For freedom of motion, the upper section has an upper torso stretch panel encircling the waist line. Entry into the garment is provided through a zippered front access opening which departs from an imaginary centerline extending between the neck opening and the crotch of the garment. The zipper path has a first segment which extends along the centerline for at least an inch, and then follows a curved radiused path segment to a second path segment which extends from the centerline less than 90 degrees from the first and which crosses the waist line and descends along the leg to a position about even with the crotch. The curved segment has a radius of at least three times the chain width of the zipper.

6 Claims, 3 Drawing Sheets

(56) References Cited

U.S. PATENT DOCUMENTS

| | | | |
|---|---|---|---|
| 5,511,246 A * | 4/1996 | Farkas et al. | 2/79 |
| 5,806,090 A | 9/1998 | Johnson | |
| 6,038,699 A * | 3/2000 | Han et al. | 2/69 |
| 6,415,440 B1 | 7/2002 | Stinton | |
| 6,477,712 B1 * | 11/2002 | Jones | 2/69 |
| 7,188,371 B2 * | 3/2007 | Ragot | 2/82 |
| 7,937,771 B2 * | 5/2011 | Mazzarolo | 2/69 |
| D643,181 S * | 8/2011 | Rickfors | D2/718 |
| D647,282 S * | 10/2011 | Gordon | D2/718 |
| 2004/0078876 A1 * | 4/2004 | Wilson | 2/458 |
| 2008/0216218 A1 * | 9/2008 | McKinney et al. | 2/457 |

OTHER PUBLICATIONS

"Ibex Rhyme Merino Wool Sweater—Full Zip (For Women)" http://www.sierratradingpost.com/ibex-rhyme-merino-wool-sweater-full-zip-for-women~p~1761h/, downloaded Jan. 3, 2014.

* cited by examiner

GARMENT WITH RADIUSED ZIPPER PATH

BACKGROUND

The present invention relates to utility garments such as one-piece coverall garments.

A flightsuit is a one-piece coverall used by the air force, but also employed in other military services and in civilian use. It avoids shirttails which could become entangled in equipment, and effectively supports pockets for tools and other elements. A conventional flightsuit, such as the U.S. Military CWU 27/P, has a central zipper which extends from the collar directly downward to the garment crotch. Yet a one-piece garment, if it is to avoid being too loose, cannot fit the wearer snugly and accommodate the full range of the wearer's motion when bending forward and backward at the waist.

Some coverall designs have attempted to accommodate this by adding an elastic stretch panel at the wearer's waist or midtorso, or by making the entire suit out of a stretch material. Another feature of a one piece suit is the ability to don and doff it quickly. Typically this has been achieved with a single closure at the front of the garment, generally a single zipper which provides a simple and speedy means of opening and closing. Yet, if a single zipper extends across the front of the garment, it restricts the stretching of the stretch panel or stretchable fabric in this dimension.

Some coveralls have attempted to get around this limitation by tilting the path of the zipper so that it extends from the wearer's shoulder, across the chest, to the opposite side hip. These suits are generally more difficult to get in and out of, and do not feel as natural to wear.

In order to manage heat, wearers will generally unzip their collar zipper a few inches. Flight suits are unzipped in this way very often and this mode of wear is very popular, sometimes being a matter of style as well as function.

What is needed is a flightsuit which accommodates a wide range of motion, while offering a simple and speedy zipper entry.

SUMMARY

The invention includes a one-piece coverall garment which has an upper section with two sleeves projecting from a torso section extending above a waist line. A lower section has a lower torso section extending downwardly from the waist line. Two legs extend downwardly from the lower torso section at a crotch. For freedom of motion, the upper section has a stretch panel encircling the upper torso extending upwardly from the waist line. Entry into the garment is provided through a zippered front access opening which departs from an imaginary centerline extending between a neck opening and the crotch. The zipper path has a first segment which extends along the centerline, and then follows a curved radiused path segment to a second path segment which extends at less than 90 degrees from the front centerline and which crosses the waist line and descends along the leg to a position about even with the crotch. The curved segment has a radius of at least three times the chain width of the zipper. This bent zipper path allows the dimension along the front centerline from neck to groin to change with the wearer's movements as the stretch panel is stretched or relaxed. In combining the stretch panels and offset zipper, full forward and backward bending can be better accommodated, allowing the wearer to move in a fuller range of motion, while still being offered the utility and protection of a one-piece garment.

DESCRIPTION OF THE PREFERRED EMBODIMENTS

Referring more particularly to FIGS. 1-6, wherein like numbers refer to similar parts, a garment 20 is shown as worn by a person 22 in FIGS. 1-4. The garment 20 is a one-piece garment or coverall.

Figures 1, 2:
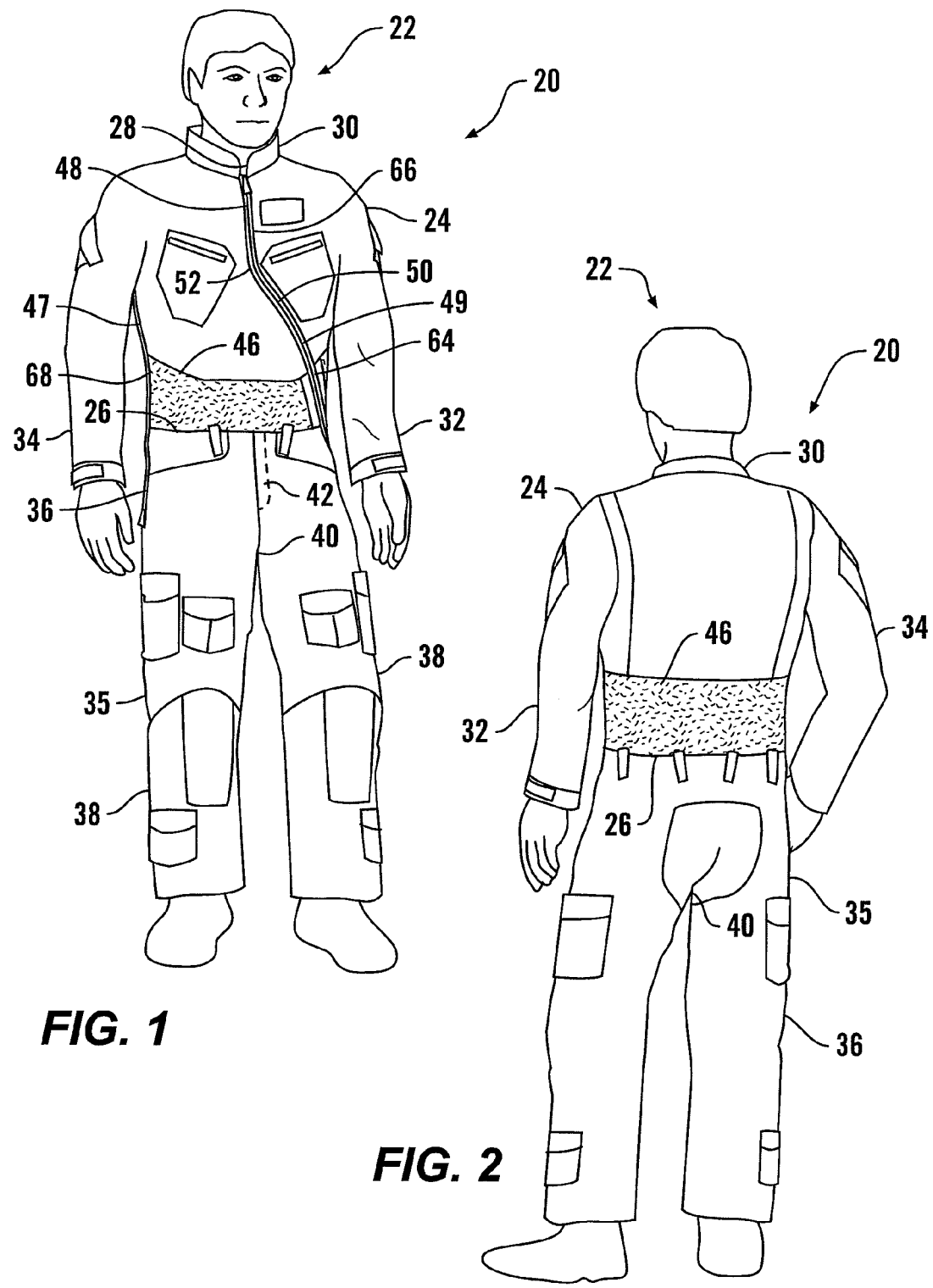
FIG. 1 is a front view of a garment of this invention.
FIG. 2 is a rear view of the garment of FIG. 1.

As shown in FIG. 1, the garment has an upper section 24 which extends upwardly from a waist line 26. The upper section 24 extends to a neck opening 28 which may be terminated by an upstanding collar 30. The upper section 24 has two sleeves 32, 34 which extend outwardly from the torso section. A lower section 35 extends downwardly from the waist line 26 and has a lower torso section 36 from which two legs 38 extend downwardly. The legs 38 join the lower torso section 36 at a crotch 40. The lower torso section 36 may have a front fly 42 which covers a pants access opening (not shown) which terminates at the waist line 26.

Figure 5:
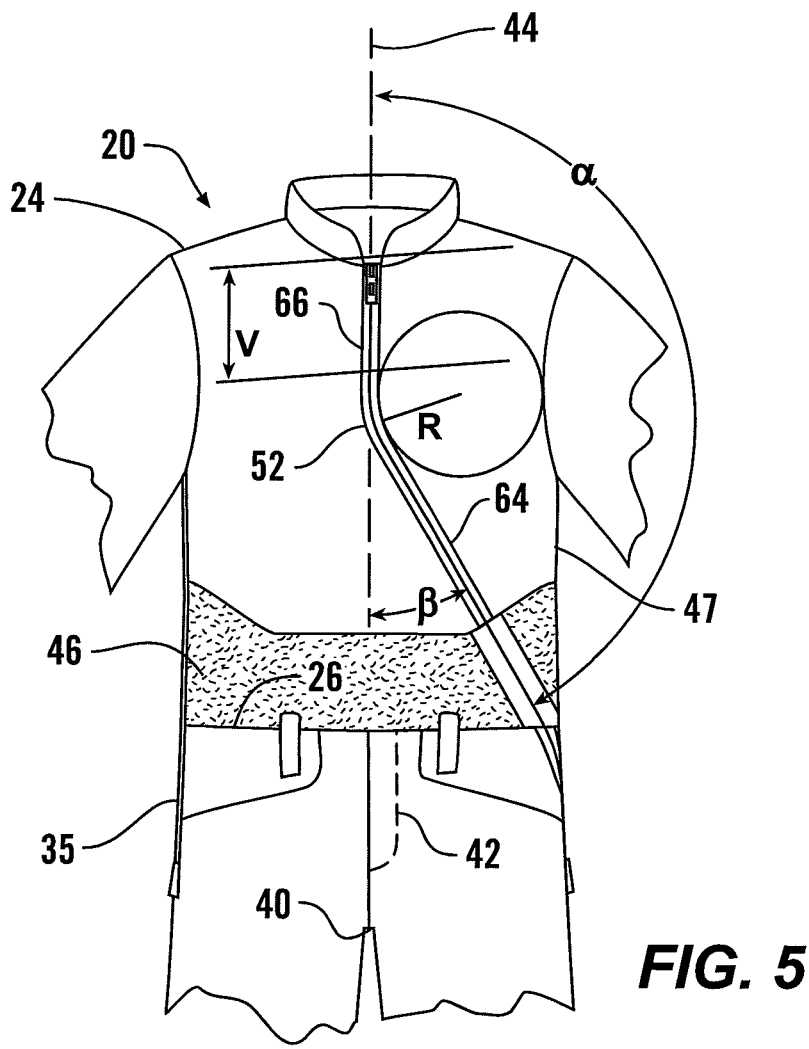
FIG. 5 is a fragmentary schematic view of the zipper closure of the garment of FIG. 1.

An imaginary front centerline 44, shown in FIG. 5, may be defined to extend from the crotch 40 to the neck opening 28 at the collar 30. The upper section 24 has a stretch panel 46 which extends upwardly from the waist line and forms a portion of the upper torso section 47 which encircles the garment above the waist line. The stretch panel 46 is formed of a stretchable material, preferably with a stretch of from 60 to 100 percent, while the rest of the garment is formed of a more durable and less stretchy material, which may be one with substantially no stretch. Depending on the construction, a wide level of stretch may be employed from 3 percent to 300 percent. A level of stretch may be defined as the amount a given sample of material will stretch in response to a given applied tension in a particular direction. The stretch panel 46 may be cotton, wool, polyester, nylon, or a blend thereof. The stretch panel may be a polyester, Lycra® brand synthetic polyurethane-based elastane textile blend. A cotton material may be used where flame retarding properties are required. The nonstretch material may be the flame-resistant meta-aramid material fabric offered by DuPont under the trademark Nomex®, and the stretch material may be a more stretchable material such as stretch Nomex® material. As shown in FIGS. 1 and 2, the stretch panel may have a vertical height of about four inches in the front, extending to about eight inches in the back. The stretch panel may be larger in the back, as the wearer's range of forward bending is greater than the range of backward bending. However, the stretch panel may be from as little as ½ inch to 30 inches or as much as the entire upper part of the garment.

Figure 3:
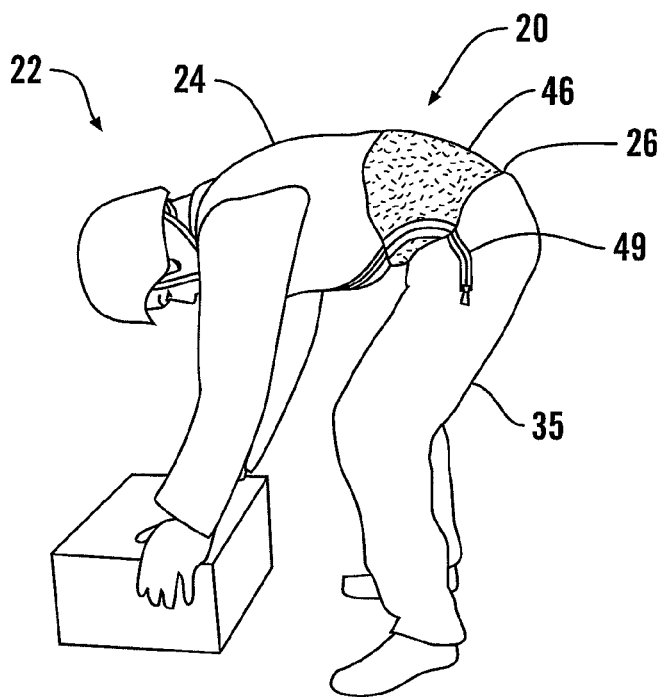
FIG. 3 is a side perspective view of the garment of FIG. 1 on a wearer bending forward.
Figure 4:
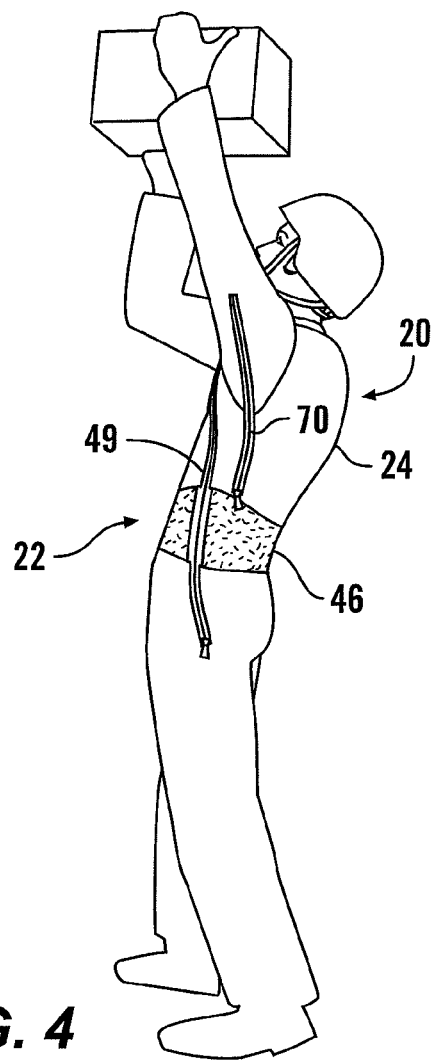
FIG. 4 is a side perspective view of the garment of FIG. 1 on a wearer reaching upwardly.

As shown in FIGS. 3 and 4, at the more extreme range of a wearer's motion, for example bending over or reaching overhead, the stretch panel distorts, allowing the wearer to move more freely. For convenient and rapid donning and doffing of the garment 20, the user requires an access opening.

In the garment 20, a front access opening 48 begins at the neck opening 28 between the projecting ends of the collar 30. A zipper 49 is sewn to the garment and follows a path 50 which extends along and selectively opens and closes the front access opening 48. From the neck opening 28, it extends downwardly along the front centerline 44 in a first upper segment 66 for a limited distance V of at least one inch, but it may extend for five inches or more, before following a radiused curve toward the wearer's side. Although the first zipper segment extends generally along the front centerline in the illustrated embodiment, it should be noted that the path could deviate up to 45 degrees from the vertical.

Figure 6:
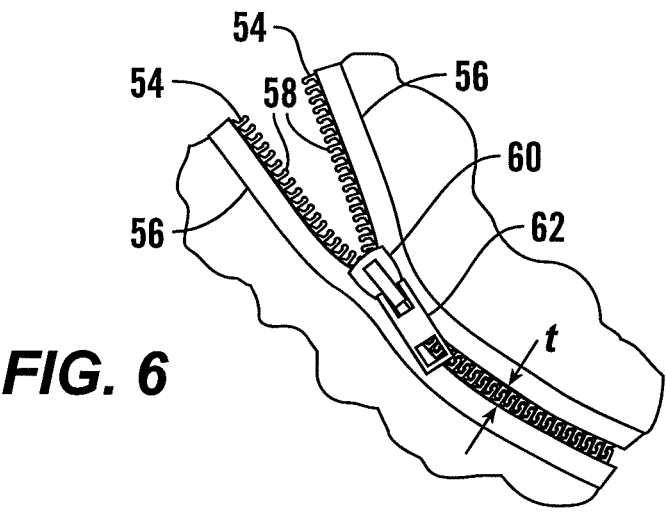
FIG. 6 is an enlarged fragmentary view of a curved segment of the zipper closure of the garment of FIG. 5.

In the illustrated embodiment, the curved segment 52 of the zipper path 50 extends to the wearer's left, as shown in FIG. 5. As shown in FIG. 6, the zipper 49 has teeth 54 secured to two opposed tapes 56 to define two columns 58 of teeth. Each tape is secured such as by stitching to opposite sides of the front access opening 48. A slider 60 engages both columns of teeth. A pull tab 62 is connected to the slider 60. By engaging the pull tab and advancing the slider, the user can bring the columns of teeth 54 together, to close the opening, or may separate them to open the opening. The zipper may be provided with two sliders with pull tabs, allowing opening of the opening from both the top and the bottom. The combined columns of teeth is known as the chain, and the combined width t of the combined teeth is known as the chain width. To permit a smooth operation of the zipper as it traverses the curved segment 52 of the zipper path 50, the radius R of the curved segment 52 of the zipper path 50 must be at least three times the chain width t. The zipper path may also be considered in terms of at what point it reaches the side of the garment. Where it is desired not to compromise the forward bending of the person by interposing the zipper path towards the front, a side angle is defined between planes extending through the front centerline and the side of the garment, this angle being 90 degrees. For best performance then, the zipper path extends towards a side to within 80 percent of the side angle at or before it crosses the waist line.

After turning towards the wearer's side, the zipper path 50 extends along a second lower segment 64 which extends across the waistline 26 at a position along the wearer's side, as shown in FIG. 4, and then extends below the waistline to a position about even with the crotch 40 as shown in FIG. 5. Because the second lower segment 64 of the path crosses the stretch panel 46, it will limit the stretch of the panel in the crossing region. Hence the path of crossing should be along the wearer's side, rather than the front or back of the wearer's torso, because the frontward bending is a more common motion of the wearer than one to the side. To move the zipper off to the side, but without hitting the wearer's side at a position substantially above the waist line, the angle α between the first upper segment 64 and the second lower segment 66 must be greater than 90 degrees, as shown in FIG. 5. In other words, the lower segment 64 of the zipper path departs from the centerline 44 by an angle β which is less than 90 degrees.

The garment 20 thus provides a convenient entry to the wearer, who can fully open the zipper to don the garment. Moreover, the wearer can lower the zipper along the first segment which closely approximates the function and appearance of a conventional vertical zipper. With the zipper avoiding a direct path through the stretch panel, the stretching of the stretch panel for backwards and forwards bending is not substantially compromised.

The garment 20 may further include other openings for convenient access. For example a side vent opening 68, shown in FIG. 1, which extends across the waist line and continues under the right arm and on to the sleeve. Another shorter zipper 70 may be provided on the left sleeve providing a vent opening which continues onto the side of the upper torso of the garment. The garment may be provided with pockets for accessories and protective pads as desired, and may have hook and loop fastener straps at the ankles and wrists to permit adjustment of the openings for hands and feet.

It should be noted that the stretch panel may extend upwardly to the collar, or the entire upper portion of the garment may be formed of a stretch material.

It is understood that the invention is not limited to the particular construction and arrangement of parts herein illustrated and described, but embraces all such modified forms thereof as come within the scope of the following claims.

I claim:

1. A garment comprising:
an upper section extending upwards from a waist line to a neck opening, wherein the upper section has an upper torso section with two sleeves which extend outwardly from the torso section;
a lower section extending downwardly from the waistline having a lower torso section, having two legs which extend downwardly from the lower torso section which join the lower torso section at a crotch, wherein a front centerline extends from the crotch to the neck opening;
a zipper extending from the neck opening across the waistline to the lower torso section, wherein a portion of the zipper extends along a side of the garment spaced sidewardly from the front centerline, the zipper having two columns of engageable teeth, which, when engaged with each other define a chain with a width, wherein the zipper extends along a zipper path, and wherein the zipper path has a first upper segment which extends downwardly and which is at least one inch long, and a second lower segment which extends across the waistline, the second lower segment extending at an angle of less than 90 degrees from the front centerline, and the zipper path having a radiused segment which connects the first upper segment to the second lower segment, the radiused segment being a curved path segment with a radius of at least three times the zipper chain width; and
a stretch panel forming a portion of the upper section and defining a portion of the upper torso section which extends above the waist line, with the lower section having a first level of stretch in the direction of the front centerline towards the neck opening, and the stretch panel having a second level of stretch in the direction of the front centerline towards the neck opening, wherein the second level of stretch is greater than the first level of stretch.

2. A garment comprising:
an upper section extending upwards from a waist line to a neck opening, wherein the upper section has an upper torso section with two sleeves which extend outwardly from the torso section;
a lower section extending downwardly from the waistline having a lower torso section, having two legs which extend downwardly from the lower torso section which join the lower torso section at a crotch, wherein a front centerline extends from the crotch to the neck opening;
a zipper extending from the neck opening across the waistline to the lower torso section, wherein a portion of the zipper extends along a side of the garment spaced sidewardly from the front centerline, the zipper having two columns of engageable teeth, which, when engaged with each other define a chain with a width, wherein the zipper extends along a zipper path, and wherein the zipper path has a first upper segment which extends downwardly and which is at least one inch long, and a second lower segment which extends across the waistline, the second lower segment extending at an angle of less than 90 degrees from the front centerline, and the zipper path having a radiused segment which connects the first upper segment to the second lower segment, the radiused segment being a curved path segment with a radius of at least three times the zipper chain width; and a stretch panel forming a portion of the upper section and defining a portion of the upper torso section which extends above the waist line, wherein the lower section is comprised of a first material, and the stretch panel is comprised of a second, different material, the second material being a stretchable fabric of greater stretch than the first material.

3. The garment of claim 2 wherein the first upper segment extends downwardly along the front centerline.

4. A garment comprising:

an upper section extending upwards from a waist line to a neck opening, wherein the upper section has an upper torso section with two sleeves which extend outwardly from the torso section;

a lower section extending downwardly from the waistline having a lower torso section, having two legs which extend downwardly from the lower torso section which join the lower torso section at a crotch, wherein a front centerline extends from the crotch to the neck opening;

a stretch panel forming a portion of the upper section and defining a portion of the upper torso section which extends upwardly from the waist line; wherein the lower section is comprised of a first material, and the stretch panel is comprised of a second, different material, the second material being a stretchable fabric of greater stretch than the first material; and a zipper extending from the neck opening on the centerline across the waistline to the lower torso section, wherein a portion of the zipper extends along a side of the garment spaced sidewardly from the front centerline, wherein the zipper extends along a zipper path which crosses the stretch panel, and wherein the zipper path has a first upper segment which extends downwardly, and wherein a side angle is defined between planes extending through the front centerline and the side of the garment, this angle being 90 degrees, and wherein the zipper path extends towards a side to within 80 percent of the side angle at or before it crosses the waist line.

5. The garment of claim 4 wherein the zipper has two columns of engageable teeth, which, when engaged with each other define a chain with a width, wherein the zipper path first upper segment extends along the front centerline at least one inch long, and the zipper path has a second lower segment which extends across the waistline, the second lower segment extending at an angle of greater than 90 degrees with respect to the first upper segment, and the zipper path having a radiused segment which connects the first upper segment to the second lower segment, the radiused segment being a curved path segment with a radius of at least three times the zipper chain width.

6. The garment of claim 4 wherein the first upper segment extends downwardly along the front centerline.

* * * * *